Nov. 24, 1925.
J. H. WAGENHORST
1,562,813
METHOD OF MAKING RIMS
Original Filed June 4, 1924    3 Sheets-Sheet 1
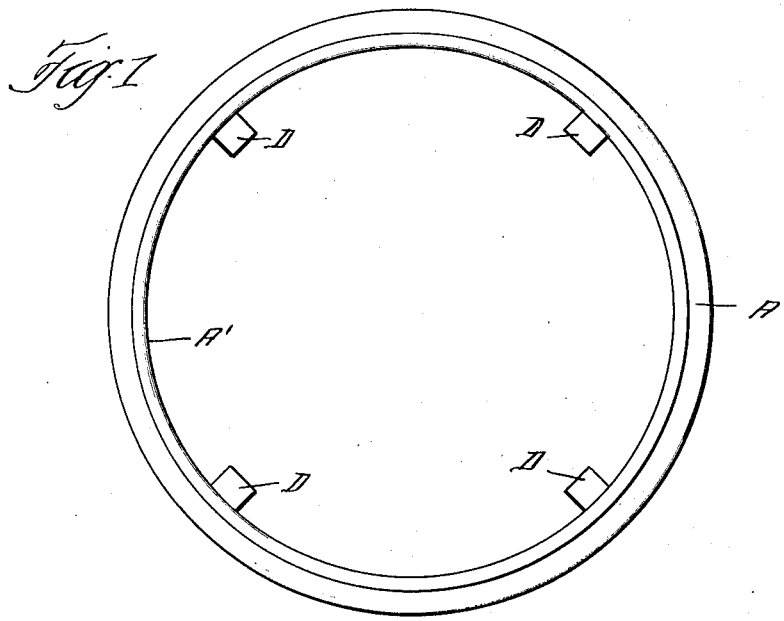
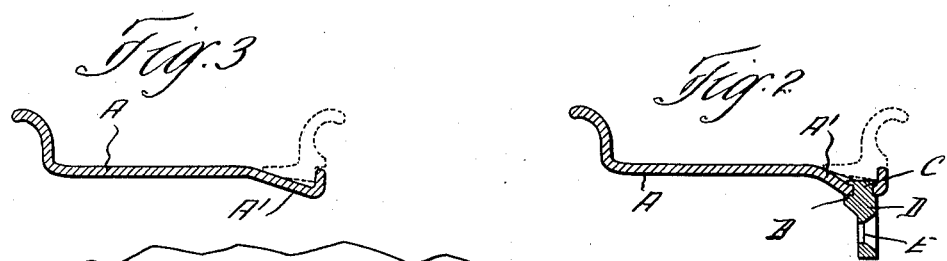
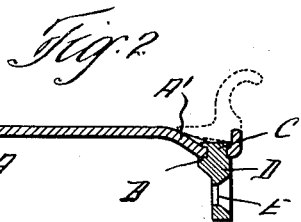
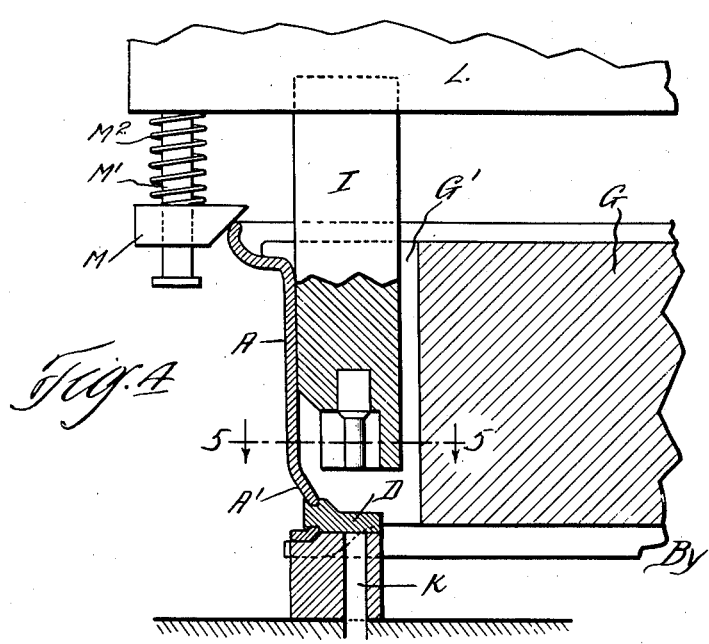
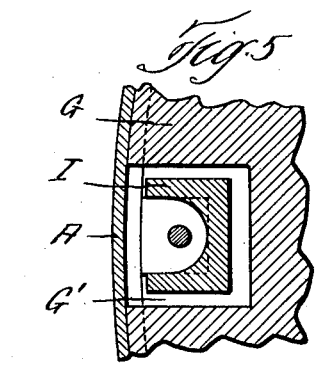
Inventor
J. H. Wagenhorst
By Hull, Brock, & West.
Attys.

Nov. 24, 1925.
J. H. WAGENHORST
1,562,813
METHOD OF MAKING RIMS
Original Filed June 4, 1924   3 Sheets-Sheet 3
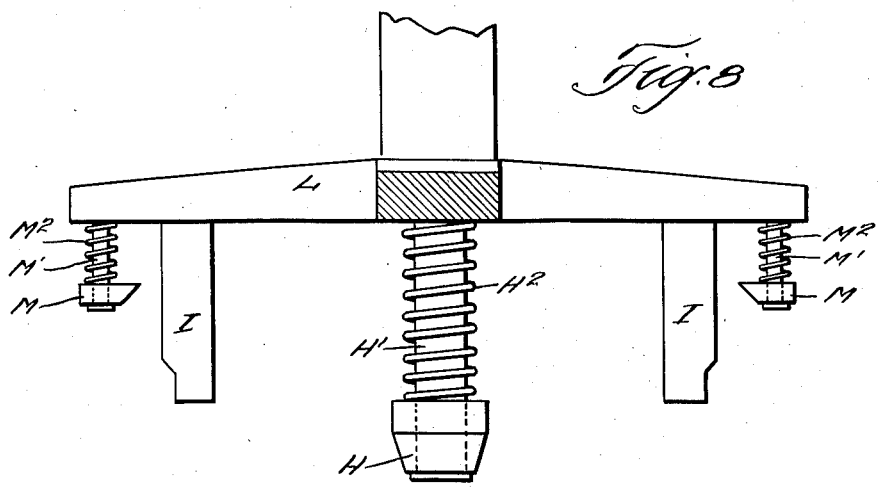
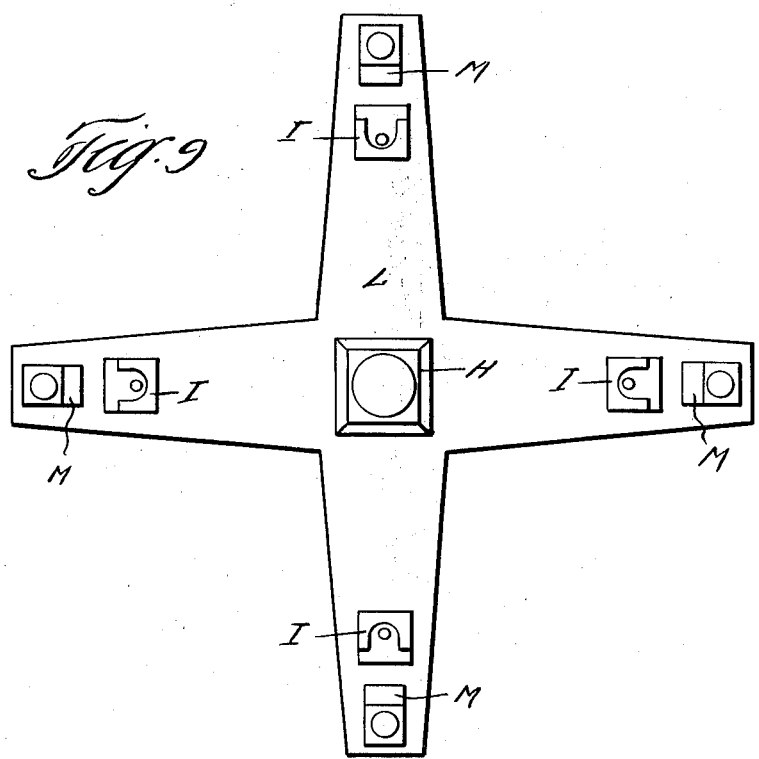
Inventor
J. H. Wagenhorst
By Hull, Brock, & West
Attys.

Patented Nov. 24, 1925.

1,562,813

UNITED STATES PATENT OFFICE.

JAMES H. WAGENHORST, OF JACKSON, MICHIGAN.

METHOD OF MAKING RIMS.

Application filed June 4, 1924, Serial No. 717,718. Renewed October 15, 1925.

*To all whom it may concern:*

Be it known that I, JAMES H. WAGENHORST, a citizen of the United States, residing at Jackson, in the county of Jackson and State of Michigan, have invented a certain new and useful Improvement in Methods of Making Rims, of which the following is a full, clear, and exact description, reference being had to the accompanying drawings.

This invention relates generally to tire carrying rims for motor vehicles and more particularly to the method of making the same.

In the manufacture of sheet metal rims having clamping lugs permanently connected thereto, it is of the utmost importance that the finished rim should be as true in roundness as it is possible to make them commercially, and that the bolt holes or opening in the attached lugs should be accurately positioned, so that the rim can be fitted readily upon the fastening bolts carried by the wheel body upon which the rim is mounted.

The object of the invention, therefore, is to provide a simple and inexpensive method whereby these features of accuracy can be obtained, and another object of the inven30 tion is to provide a method whereby the clamping lugs can be quickly and securely connected to the rim without impairment of either the rim or clamping lugs.

With these objects in view the invention consists in the various steps hereinafter described and set forth in the appended claims.

Figure 6:
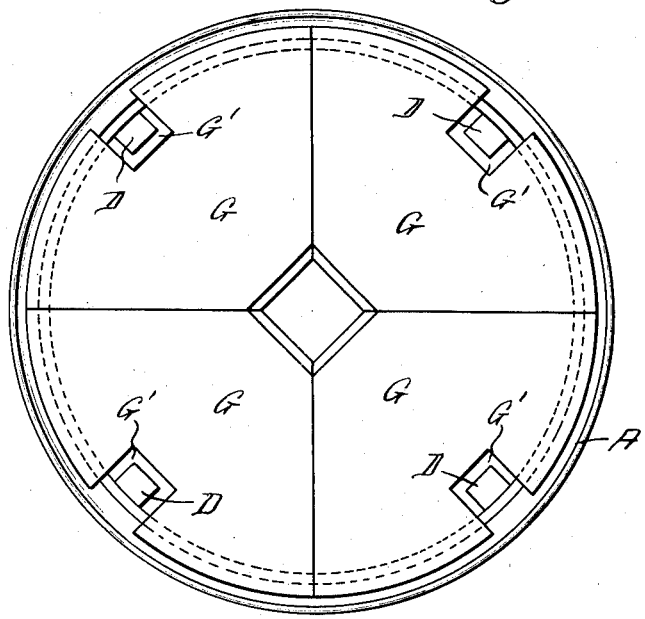
Figure 7:
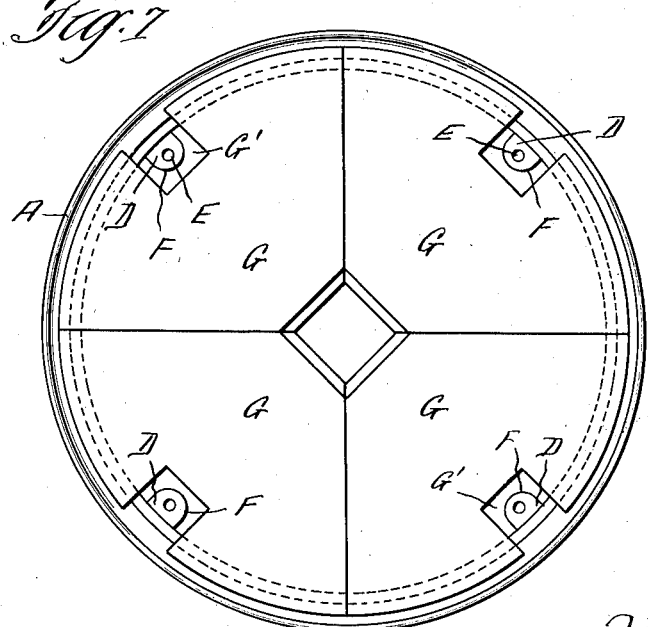

In the drawings forming a part of this specification, Fig. 1 is a face view of a rim to which the unifinished clamping lugs have been attached; Fig. 2 is a sectional view of the rim taken through the finished attached lug; Fig. 3 is a sectional view of the rim at a point intermediate the lugs; Fig. 4 is a detail sectional view of one form of holding and punching means for punching and finishing the attached lugs; Fig. 5 is a detail sectional view on the line 5—5 of Fig. 4; Fig. 6 is a view of the rim with unpunched and unfinished lugs arranged in the holding means preparatory to punching and trimming; Fig. 7 is a similar view showing the lugs punched and trimmed; Fig. 8 is a detail view illustrating one form of punching device; and Fig. 9 is an inverted plan view of the same.

In carrying out my invention I first provide a sheet metal rim A which is rolled from either a hot roll section or a piece of flat stock. The ends are then welded together and the weld trimmed off. The rim thus formed is then sized either by expansion or contraction.

In the drawings, I have shown the rim as formed with a groove A' at the outer side thereof to receive a detachable flanged ring but it will of course be understood that my invention is not confined to this particular type of rim but is applicable to all types of sheet metal rims having lugs permanently connected or attached thereto, that is to say, the invention can be used in connection with straight side and clincher type rims and from rims formed of flat stock or hot roll sections.

After the rim has been properly formed and sized, the base is apertured at definite points as shown at B in order to receive the rivet portion C of the clamping lugs D, and it will be understood that, if desired, these apertures B can be punched at the same time that the rim is sized and shaped.

After the clamping lugs D have been positioned with the rivet portion C in the openings B, the rivet portions are headed down thereby permanently attaching the clamping lugs to the rim. There may be one, two or more rivet portions C on each clamping lug D. At the time the clamping lugs D are attached to the rim they are imperforate, that is, they have no bolt receiving apertures or openings and they are usually square in form or, in other words, unfinished as to size and form.

The clamping lugs D are attached to the rim in their imperforate or solid condition because if the lugs are first perforated or apertured and then attached to the rim, there is a tendency for the lugs to break down toward the aperture and this breaking down tends also to distort the rim to a certain extent at the points of attachment. The clamping lugs are therefore attached, as before stated, in their imperforate condition.

After the clamping lugs have thus been attached, bolt holes or openings E are punched or bored in any suitable manner and it will be understood that all of the lugs can be punched at the same time, that is simultaneously, or they can be punched successively or in pairs as preferred.

While the punching or boring operations are being carried out, the rim is held true to size and shape in any suitable manner and by following this step, the bolt receiving holes, when made, will be accurately spaced so that the rim will fit properly over the bolts on the wheel body.

In practice, I prefer to punch and counterbore the openings E at one operation and I also prefer to trim or round the edges F at the same time that the bolt openings are punched or bored. It will be understood, however, that this trimming or shaping operation could be accomplished either before or after the punching or boring operation but, in order to save operations, it is preferred to accomplish the same simultaneously with the punching operation.

My invention relates more particularly to the method of making the rim as above set forth, and the apparatus whereby this method or process is carried out may vary according to the necessities or preferences of the manufacturer.

In Figs. 4, 5, 6, 7, 8 and 9, however, I have illustrated one form of apparatus for carrying out my method or process and by reference to these figures it will be noted that four segments G are arranged within the rim and are adapted to be spread outwardly to a limit of extent by means of a plunger H and punches I are employed to punch the bolt holes and at the same time trim or round the clamping lug as most clearly shown in Fig. 7, the segments G having recesses G' sufficiently large to permit the entrance of the punches and suitable handles or dies K are arranged to support or hold the lug and rim during these punching operations.

In connection with the head L which carries the plunger H and punches I, I also provide spring actuated holding devices M which contact with the outer flange of the rim and cooperate with the expanding sections G to hold the rim to proper size and shape during the punching operations. The plunger H is carried upon a shank H' around which is arranged the coil spring H² and the members M are also carried upon rods M' around which coil springs M² are arranged, these spring actuated features permitting the parts to yield and prevent any undue expansion or contraction while the punching operation is being accomplished and after the said operation has been accomplished, these springs act to strip or separate the parts.

It will thus be seen that I provide a simple method of making a rim with accurately disposed apertured lugs permanently connected thereto, and also illustrating one form of mechanism whereby this method or process can be accomplished.

While I have recited the steps in certain order, it will of course be understood that the order of taking the steps is not absolutely essential and furthermore, while I have described the lugs as being attached to the rim by riveting, these lugs can be welded to the rim if so desired, it being understood that in this instance the lugs will of course be imperforate and that the punching or boring of the holes will take place after the lugs have been permanently connected to the rim.

By constructing the tire carrying rim in the manner hereinbefore recited, breaking down of the clamping lugs during the riveting operation is avoided and also the distorting or misshaping of the rim at the points of attachment avoided. A rim will therefore be provided with the lugs properly spaced and the bolt holes therein accurately positioned.

Having thus described my invention, what I claim is:—

1. The herein described method of making rims which consists in forming a rim and sizing and shaping to a circle, punching openings in said rim at definite points, attaching lugs to said rim at said apertured points and then forming bolt openings in said lugs.

2. The herein described method of making rims which consists in forming a rim and sizing and shaping to a circle, punching openings in said rim at definite points, attaching lugs to said rim at said apertured points, then forming bolt openings in said lugs and trimming said lugs to shape.

3. The herein described method of making rims which consists in forming a rim and sizing and shaping to a circle, punching openings in said rim at definite points, attaching lugs to said rim at said apertured points, then forming bolt openings in said lugs, trimming said lugs to shape and counterboring the bolt openings in the lugs.

4. The herein described method of making rims, which consists in forming the rim, sizing and shaping the same to a circle, punching openings in said rim at definite points, attaching lugs to said rim at said apertured points, maintaining said rim true to size and roundness and perforating said lugs while so held.

5. The herein described method of making rims which consists in forming a rim, attaching lugs to said rim at definite points and then forming bolt openings in said lugs.

6. The herein described method of making rims which consists in forming the rim and sizing and shaping the same, permanently attaching lugs to said rim at definite points and simultaneously forming bolt openings in said lugs.

7. The herein described method of making rims which consists in forming the rim and sizing and shaping the same, permanently attaching lugs to said rim at definite points without deforming the rim at said points, maintaining the rim true to roundness and forming counterbored bolt openings in said lugs and trimming the same.

8. The herein described method of making rims which consists in providing a circular rim, attaching lugs to said rim at definite points and then perforating said lugs and holding said rim true to size and shape while said lugs are so perforated.

9. The herein described method of making wheels which consists in providing a circular sheet metal rim, attaching lugs to said rim at definite points, and then perforating and trimming said lugs and holding said rim true to size and shape during such operations.

In testimony whereof, I hereunto affix my signature.

JAMES H. WAGENHORST.